United States Patent [19]

Tromeur

[11] Patent Number: 4,465,916

[45] Date of Patent: Aug. 14, 1984

[54] METHOD FOR MANUFACTURING A PLASMA IGNITION DEVICE FOR AN INTERNAL COMBUSTION ENGINE

[75] Inventor: Jean-Francois Tromeur, Pully, Switzerland

[73] Assignee: Espada Anstalt, Universal Marketing, Vaduz, Liechtenstein

[21] Appl. No.: 381,038

[22] Filed: May 24, 1982

[30] Foreign Application Priority Data

Jun. 3, 1981 [CH] Switzerland .......................... 3635/81

[51] Int. Cl.[3] .............................................. B23K 11/00

[52] U.S. Cl. ....................................... 219/78.01; 445/7

[58] Field of Search .................... 445/7; 219/78.01, 90, 219/85 R

[56] References Cited

U.S. PATENT DOCUMENTS 1,228,767 6/1917 Furber .................................... 445/7

3,909,575 9/1975 Phares et al. ......................... 219/50

*Primary Examiner*—Roy N. Envall, Jr.
*Assistant Examiner*—Catherine M. Sigda
*Attorney, Agent, or Firm*—Trexler, Bushnell & Wolters, Ltd.

[57] ABSTRACT

A plier (35, 36) of which the jaws are provided with claws (38, 39) of electrically good conductor metal, threaded in a complementary way to that of the threaded portion (10) of the cap (4) of the device (1), grips the device (1) by that threaded portion (10) of the cap (4) while strongly pressing the capsule (17) on the threaded end (10) of the cap (4) and heating those parts by Joule effect. The plier rests on a portion (26) which rests itself on the frame (25) of the machine. Hence, the insulating portion of ceramic material (2) of the device is not subjected to any stress due to the pressure exerted during such welding operation.

4 Claims, 2 Drawing Figures

METHOD FOR MANUFACTURING A PLASMA IGNITION DEVICE FOR AN INTERNAL COMBUSTION ENGINE

The present invention relates to a method for manufacturing a plasma ignition device for internal combustion engines, of the type having a precombustion chamber formed by a capsule welded on the end of the cap and forming a ground electrode co-operating with the active end of the central electrode. Such a welding, effected by a joining technique under a Joule effect, requires that the capsule be pressed against the cap end with a considerable force, of about 500 kg (5000 Newton), which is not well tolerated by the ceramic material of the insulating body which may be cracked, resulting in the risk of having important discards, sealing defects, breaking of the ceramic body after a certain time of operation. In the case of devices of which the metal cap is crimped on the insulating body, the application of such a force is susceptible of deteriorating the crimping.

The present invention aims at avoiding those drawbacks, by effecting this electric welding operation in conditions such that the ceramic material and the possible crimping area are not subjected to any stress due to the compression of the capsule against the end of the cap during the welding. To this effect, according to the invention, the threaded portion of the cap is engaged in a threaded piece forming support for the cap during the welding, and a force sufficient to produce a good welding of the capsule to the cap is exerted on the cap, at the same time that the welding current is supplied to the capsule. Hence, only the capsule and the threaded end of the cap are subjected to a mechanical stress due to that force. As a fact, by proceeding in such a way, the force applied acts only on the metal parts in contact (capsule and cap) to the exclusion of all other parts of the ignition device.

The attached drawing illustrates, by way of example, an implementation of the method according to the present invention.

Figure 1:
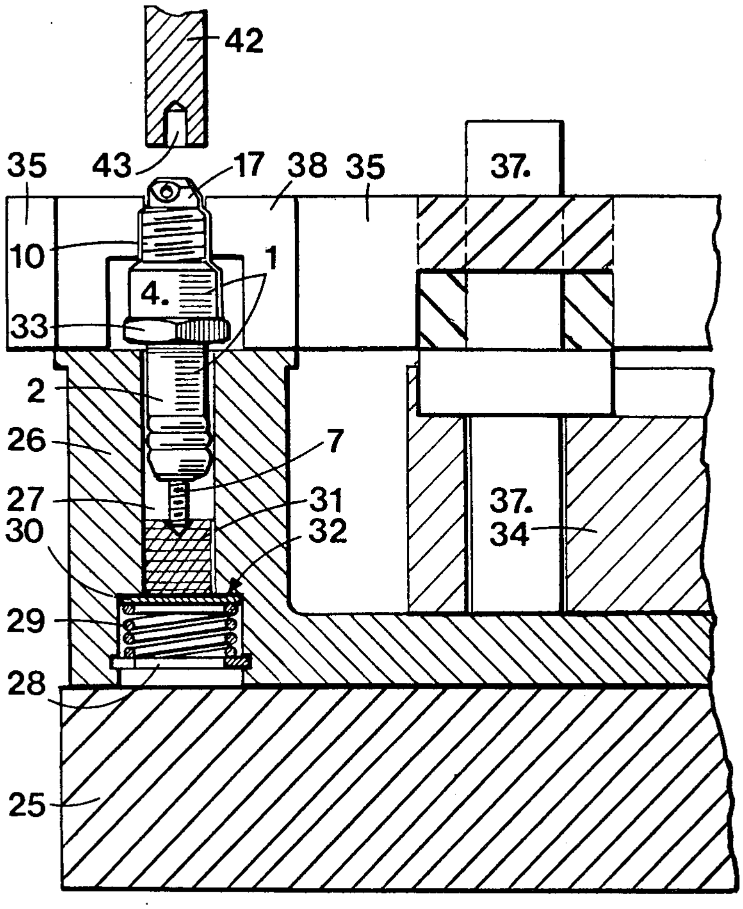
FIG. 1 is a partial vertical cross-section view according to 1—1 of FIG. 2, of a machine for executing such implementation of the method.
Figure 2:
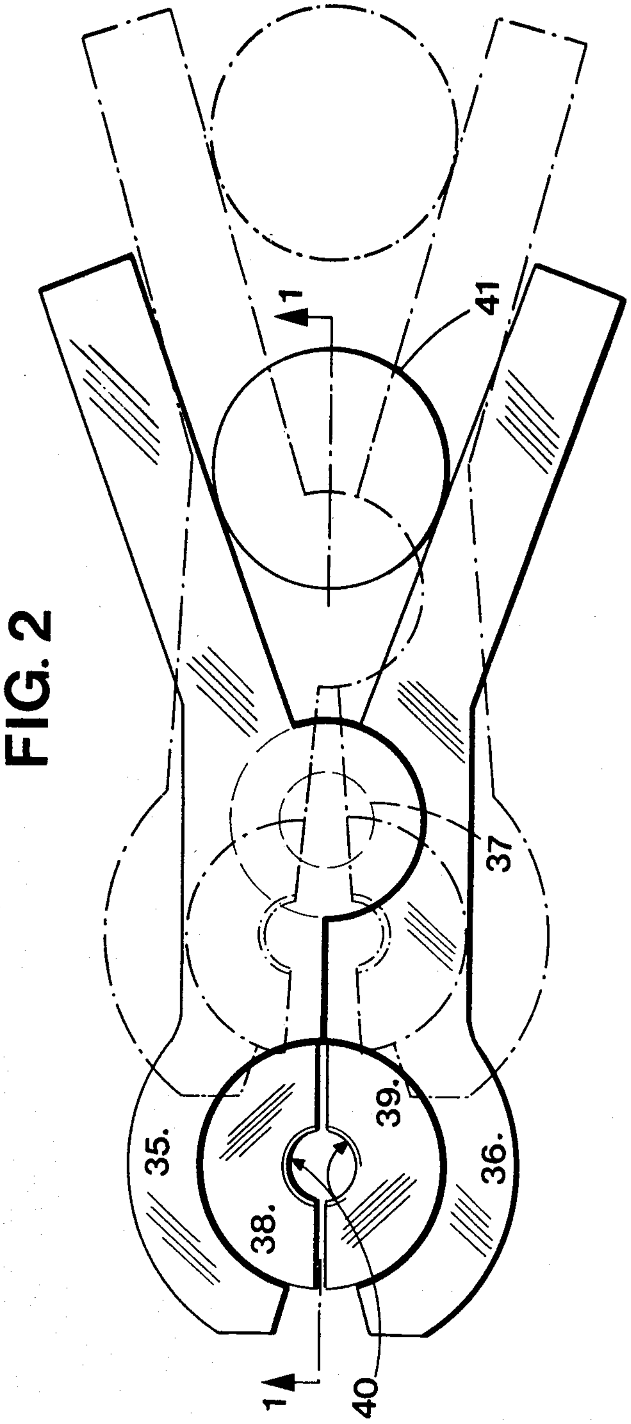
FIG. 2 is a plane, partial view, corresponding to FIG. 1.

The example represented corresponds to the case of an ignition device wherein the fixing of the central electrode to the insulating body, and fixing of the insulating body to the metal cap are effected by means of a brazing technique ceramicmetal, as described in the Swiss patent appln. No. 4212/80.

The invention is not limited to that case; to the contrary, it may also find application in the conventional case wherein this fixing or attachment is effected by crimping, or else in the case where the capsule is fixed by welding on a cap in which the insulating body is fixed by means of a nut.

The numeral 25 represents the fixed metal table (made of copper and acting as a ground electrode) of the machine, on which there is mounted a chain or rotating plate 26, sliding on this table. The rotation axis of the plate 26 is not visible, being located outside of the drawing, on the right-hand side. This plate rotates step by step and presents a series of alveoli such as the one represented at 27, which are distributed circularly about the axis.

A convector 1 (or spark plug) is brought into the alveole 27, so that only its insulating portion 2, of ceramic material for example, and the threaded end 7 of the central electrode of the convector 1, are engaged into this alveole. The cap 4, with its threaded portion 10 is located above the upper end of the alveole 27.

As the base of the alveole 27, there is provided the following arrangement to act as a support and as an axial positioning means for the convector 1. A circlip 28 forms a support for one end of the compression spring 29 which acts with its other end against a washer 30 supporting a cylindrical part 31 of insulating material and being able to slide in the alveole and which rests the threaded end 7. In the position represented, the washer is pressed against a shoulder 32 of the alveole, ensuring the correct positioning of the convector, for which the hexagonal portion 33 of the cap 4 is a certain distance from the rotating plate 26.

A carriage 34 is mounted and controlled to slide radially on the rotating plate 26. It carries pliers of which the arms are shown at 35, 36; the pivoting axis of those arms is at 37. The pliers 35, 36 and its pivoting axis 37 are movable between the working position represented in full lines and the rest position indicated in interrupted lines. The arms 35, 36 of the pliers are in contact with the plate 26 which forms a support for them. Two copper parts 38, 39 forming claws are fixed in the inside of the jaws of the pliers. They have a semi-annular shape, their central portion presenting a threading 40 complementary of the threading 10 and forming a sort of nut for that threaded portion 10.

A control member 41, actuated by means not represented, is provided to act on the arms 35, 36 of the pliers, to force them to come to the closed working position, represented in continuous lines. Resilient means not represented bias the pliers towards its open position represented in interrupted or dotted lines.

The operation is as follows.

A convector 1 being brought into an alveole 27 by automatic supply means or the like and the plate 26 being in the position visible in the drawing, the pliers support 34 takes a working position and the control member 41 acts on the arms 35, 36 of the pliers to close it. Previously, capsule 17 has been brought on the threaded end of the cap 4. The correct centering of the capsule is provided, during welding, by a tube, for example of aluminum, of which the inner diameter is equal to that of the active central electrode, whereas its outer diameter is equal to the opening of the capsule 17. An axial hole 43 having a diameter slightly bigger than that of the tube is provided in the end of one electrode 42. Upon closure of the pliers, the copper claws of the pliers come, by means of their threaded portions, in mesh with the thread 10. According to the angular position of the pitch of the convector, this closure motion of the pliers will cause a slight axial displacement (in one direction or in the other) of the convector, to allow the correct co-operation of the threads 10 and 40. The axial play existing between the portion 33 and the upper level of the plate 26 is provided to that effect.

The pliers being closed, the convector is firmly held by its threaded portion 10 when the welding electrode 42, co-axial with the alveole 27 and the convector 1, comes to act on the capsule 17 to press it against the threaded end 10 of the cap 4, while at the same time that current supplied to the electrode 42 (whereas the parts 25, 26, 35, 36, 38, 39 are grounded) causes the heating by Joule effect of the parts in contact with the capsule 17 and with the cap 4. The force exerted by the electrode 42 on the capsule 17 is transmitted to the threaded portion 10 of the cap and by that threaded portion to the pliers 35–36, and then to the plate 26 and to the frame of the machine, with no effect on the part 2 of ceramic material of the convector 1.

Safety electric means may appropriately be provided to stop the machine if by accident, upon the closure motion of the pliers, the threads 10 and 40 come exactly ridge-to-ridge, preventing then the appropriate co-operating of those threads.

The way of proceeding that has just been described, to weld the capsule on the cap, resolves definitely the problem inherent to the manufacturing of convectors of the type described here above. As a matter, in the case of this type of convector, it is not possible to weld the ground electrode before mounting the ceramic, because of a possible excentricity of the insulating body, coming from a moulded paste and cooked in an oven. It is also impossible to make this electrode with refractory steel, for economical and technical reasons. The machinability of those steels by chip removal presents serious difficulties. Mainly because of the refractory quality of those steels, all the heat generated by machining those steels has to be discharged through the tool. Those machining difficulties would result in such high cost that it would take away any chance of success on the market of manufactured products. On the other hand, the welding of that ground electrode requires a very high mechanical pressure. Now, the refractory steels, which have substantially no mechanical resistance, are very soft and are deformed under such pressure.

The capsule 17 acting as an annular ground electrode and as a pre-combustion chamber must then be made with a steel which is sufficiently mechanically resistant to withstand the high welding pressure. Those steels are not refractory, and it is then convenient to coat the capsule with a refractory film, for example by diffusion of chromium and ferro-chromium at a high temperature.

Consequently, in the example described, there is used a normal steel protected by a refractory film, and the capsule 17 is given a form which is susceptible to be welded, in a technically and economically possible way, to the cap of the convector body. An inner conical form allows to fulfill this double condition, by providing a sufficient volume for the pre-combustion, while arriving at a sharp edge allowing the said bossing welding, with Joule effect.

In an alternative, the pliers 35, 36 and the claws 38, 39 could be replaced by a massive support part, made of copper for example, provided with a threaded hole in which the convector is driven in by threaded end 10. During the welding operation, the support part would rest on the plate 26 resting itself on the table 25.

I claim:

1. Method for manufacturing a plasma ignition device for an internal combustion engine, said ignition device having a first end having a threaded connector, an opposite end including a cap with a threaded portion having an extremity, and a central electrode with an active tip, a pre-combustion chamber formed by a capsule fixed on the extremity of the cap and forming a ground electrode co-operating with the active tip of the central electrode, characterized in that in order to fix the capsule (17) to the cap (4), there is engaged in gripping mating threaded relation the threaded portion (10) of the cap into a threaded part (38–39) forming support for the cap (4) during that operation, and in that there is exerted on the capsule (17), at the same time that welding current is supplied to the capsule, a force on the cap tending to move said device in the direction of said first end sufficient to produce a good welding of the capsule (17) to the cap (4), so that only the capsule and the threaded portion of the cap are subjected to a mechanical stress due to that force, said force being resisted by the gripping mating threaded engagement of said threaded portion in said threaded part.

2. Method according to claim 1, characterized in that the threaded part in which there is engaged the threaded portion (10) of the cap is a plier (35, 36) by means of which said threaded portion (10) of the cap is gripped.

3. Method according to claim 2, characterized in that the the pliers (35, 36, 38, 39) that are used to grip the threaded portion (10) of the cap have a pair of jaws each with a threaded hemicylindrical shape (40) complementary of that of the thread (10) of the cap (4) to form a nut for that portion, when the pliers are closed.

4. Method according to claim 3, characterized in that the jaws of the pliers are provided with claws (38, 39) made of copper, which come in contact and co-operate with the threaded portion (10) of the cap (4).

* * * * *